United States Patent
Schulz et al.

[11] Patent Number: 6,116,199
[45] Date of Patent: Sep. 12, 2000

[54] MIXTURE-COMPRESSING TWO-STROKE SPARK IGNITION ENGINE WITH FUEL INJECTION

[75] Inventors: Peter Schulz, Pleissa; Klaus Matthees, Freiberg; Uwe Mehlhose, Chemnitz; Reinhart Doerfelt, Hamburg; Andreas Singer, Fraureuth, all of Germany

[73] Assignee: Dolmar GmbH, Hamburg, Germany

[21] Appl. No.: 09/214,374

[22] PCT Filed: Jun. 24, 1997

[86] PCT No.: PCT/EP97/03298

§ 371 Date: Apr. 26, 1999

§ 102(e) Date: Apr. 26, 1999

[87] PCT Pub. No.: WO98/01655

PCT Pub. Date: Jan. 15, 1998

[30] Foreign Application Priority Data

Jul. 5, 1996 [DE] Germany ............... 196 27 040

[51] Int. Cl.[7] .................................................. F02B 33/04
[52] U.S. Cl. .................. 123/73 C; 123/309; 123/305; 123/193.5
[58] Field of Search ............... 123/65 R, 73 C, 123/309, 193.1, 193.5, 305, 295

[56] References Cited

U.S. PATENT DOCUMENTS

| | | | |
|---|---|---|---|
| 4,719,880 | 1/1988 | Schlunke et al. | 123/65 WA |
| 4,790,270 | 12/1988 | McKay et al. | 123/73 C |
| 4,899,699 | 2/1990 | Huang et al. | 123/73 C |
| 5,237,966 | 8/1993 | Katoh et al. | 123/73 C |
| 5,237,972 | 8/1993 | Groff et al. | 123/257 |
| 5,249,557 | 10/1993 | Katoh et al. . | |
| 5,307,792 | 5/1994 | Takahashi . | |
| 5,645,026 | 7/1997 | Schlessmann | 123/184.46 |
| 5,746,171 | 5/1998 | Yaoita | 123/275 |
| 5,775,289 | 7/1998 | Yoshida et al. | 123/305 |
| 5,806,473 | 9/1998 | Kometani et al. | 123/73 C |

FOREIGN PATENT DOCUMENTS

| | | | |
|---|---|---|---|
| 3257 | 3/1953 | Germany . | |
| 922 311 | 1/1955 | Germany . | |
| 27 06 687 | 1/1978 | Germany | F02B 23/00 |
| 228 585 | 10/1985 | Germany | F02B 17/00 |
| 39 04 730 A1 | 10/1989 | Germany | F02B 23/08 |
| WO 87 00575 | 1/1987 | WIPO | F02B 17/00 |

*Primary Examiner*—Henry C. Yuen
*Assistant Examiner*—Hai Huynh
*Attorney, Agent, or Firm*—McCormick, Paulding & Huber LLP

[57] ABSTRACT

In order to provide a mixture-compressing two-stroke Otto engine with fuel injection into the cylinder space, in which it is in particular intended to make a homogeneous mixture formation possible, it is proposed that the combustion space (19) possesses essentially the configuration of a hemisphere and, with its combustion space axis (21), is, from the cylinder axis (20) relative to the side of the cylinder (11) located opposite the exhaust duct (14), disposed so as to be offset, the injection nozzle being disposed relative to the combustion space (19 in such a way that the upper portion of the jet cone (22) penetrates a predominant volume proportion of the combustion space (19), while the lower portion of the jet cone extends underneath the cylinder bottom plane (25) approximately obliquely to the cylinder axis (20), but outside the combustion space (19).

8 Claims, 1 Drawing Sheet

MIXTURE-COMPRESSING TWO-STROKE SPARK IGNITION ENGINE WITH FUEL INJECTION

FIELD OF THE INVENTION

The present invention relates to mixture-compressing two-stroke Otto engines with fuel injection according to the preamble of the claim 1.

BACKGROUND OF THE INVENTION

A mixture-compressing two-stroke Otto engine with fuel injection is known, in which a spherical combustion space eccentrically offset relative to the cylinder axis in the direction of the exhaust side and possessing an extension of approximately 260° is disposed (DD-A1-228 585). It is known furthermore from the publication (DD-A1-3257) to dispose a cap-shaped combustion space centrally in the cylinder head. In both types an injection nozzle terminates in each case in the side of the cylinder opposite the exhaust duct, to be more precise, below the compression chamber formed in the upper compression point (OT) in a thermally less affected area.

In the spherical combustion space located in the cylinder head, which, in the direction of the cylinder head, possesses a heat-insulating shell section, the jet cone emitted by the injection nozzle of the injected fuel extends with a predominant proportion into the spherical combustion space and, with a small proportion, as far as the edge located on the cylinder space and the compression cross section. It is intended that this edge is cooled by the injected fuel being sprayed on to the same. It is true that the known arrangement ensures that the injection nozzle is less stressed thermally, however, the position of the combustion space which is offset toward the exhaust side with its constriction is not optimal for flushing with a fresh charge of fuel.

In the cap-shaped combustion space according to the publication DD-A1-3257, the jet cone of the injection nozzle is carried in such a manner that the entire combustion space and even partly the immediate vicinity of the spark plug projecting into the combustion space is covered by thr jet cone. However, in this case merely an oblique segment of the cylinder space is penetrated by the injection jet. Also in this known arrangement, the injection nozzle is not subjected to severe thermal stress. But the injection nozzle is located only a little above the upper edge of the exchaust duct. This calls for an early injection start while the exhaust duct is still open with the disadvantages resulting herefrom.

From the DE 39 04 760 A1, an Otto internal combustion engine with direct injection is known, in which a compression area between two compression area delimitation surfaces, which comprise a part of the piston bottom of the piston as well as a part of a lower surface area of the cylinder head and disposed in one half of the cylinder cross section is defined, wherein the compression area possesses a closed side delimited from a part of the internal surface of the cylinder bore as well a s an open side in the direction toward the center of the cylinder, in which case provision is made for the compression area, in the direction of the center of the cylinder to be expanded in such a way that a central portion of the open side of the compression area is disposed close to the cylinder center and in that the compression area, in the form of a flow of air in the cylinder, produces a compressed flow, which, in the position of the piston close to the compression point, assists the evaporation of the fuel in that the injection nozzle is disposed close to a central portion of the closed side of the compression area and is directed in such a manner that at least a part of the fuel is aimed at one of the compression area delimitation surfaces so that the fuel adhering to a compression area delimitation surface is assisted in its evaporation by the compressed flow and in that the spark plug is disposed near the ecnter of the cylinder as well so as to be located opposite the central portion of the open side of the compression area and ignites the evaporated fuel blown by the compressed flow toward the spark plug.

The U.S. Pat. No. 5,307,793 (D1) shows a mixture-compressing two-stroke Otto engine with fuel injection in the cylinder space of the following construction: Into a hemispherical combustion chamber offset eccentrically to the cylinder axis in the cylinder head, a spark plug projects, on both sides of the longitudinal plane of the exhaust duct, the overflow ducts terminate directed against the cylinder side oppositely located relative to the exhaust duct, an injection nozzle terminates in the cylinder side with the exhaust duct in a thermally less stressed zone outside the compression space, the injection takes place in the direction of the compression space, the combustion space is, with its combustion space axis, disposed so as to be offset from the cylinder axis in relation to the side of the cylinder located opposite the exhaust duct, in which case the injection nozzle is disposed relative to the combustion space in such a way that the upper portion of the jet cone penetrates a predominant volume proportion of the combustion space.

SUMMARY OF THE INVENTION

The technical problem of the invention is to provide a mixture-compressing two-stroke Otto engine with fuel injection, in which the quoted disadvantages are avoided and which makes the formation of a homogeneous mixture possible. On this occasion the intention is that both the cylinder space close to the upper compression point as well as the actual combustion space are covered by the injected jet cone. In addition, a direct injection on to the spark plug and the immediate vicinity of the same is to be reliably avoided.

This technical problem is resolved with the aid of the means stated in the characterizing part of the main claim.

The position of the combustion space is offset from the exhaust duct into the opposite direction, whereby a particularly favorable disposition of the injection nozzle and division of the jet cone to the surface areas enclosing the compression space and the cylinder space before the upper compression point is achieved.

Thew formation of the mixture is particularly homogeneous if, according to a preferred embodiment of the invention, the upper and the lower portion of the jet cone each constitute approximately half of the jet cone.

A disadvantageous concentration of fuel within the region in front of or on the spark plug is avoided with certainty if, according to a further preferred embodiment, in the combustion space, a subrange of the top portion of the jet cone in which the spark plug terminates, is not acted upon thermally.

A specially adapted configuration of the jet surface can be achieved by a plurality of individual jets. The parts of the jet cone are formed of individual jets which, relative to an imaginary axis of the jet cone, may possess different jet axis angles and jet angles (FIG. 2).

An advantageous further development of these embodiments is distinguished by the jet angle possessing an aperture angle which ranges from 350° to 55° and in that the imaginary axis of the jet cone with the cylinder bottom plane includes an angle ranging between 10° and 20° and intersects the same on the side of the cylinder axis facing away from the injection axis.

BRIEF DESCRIPTION OF THE DRAWINGS

In the following the invention will be explained with the aid of embodimant examples in connection with the drawings.

In all the embodiment examples, the depiction of the spark plug and of the injection nozzle has been dispensed with for the sake of simplicity.

Thus

Figure 1:
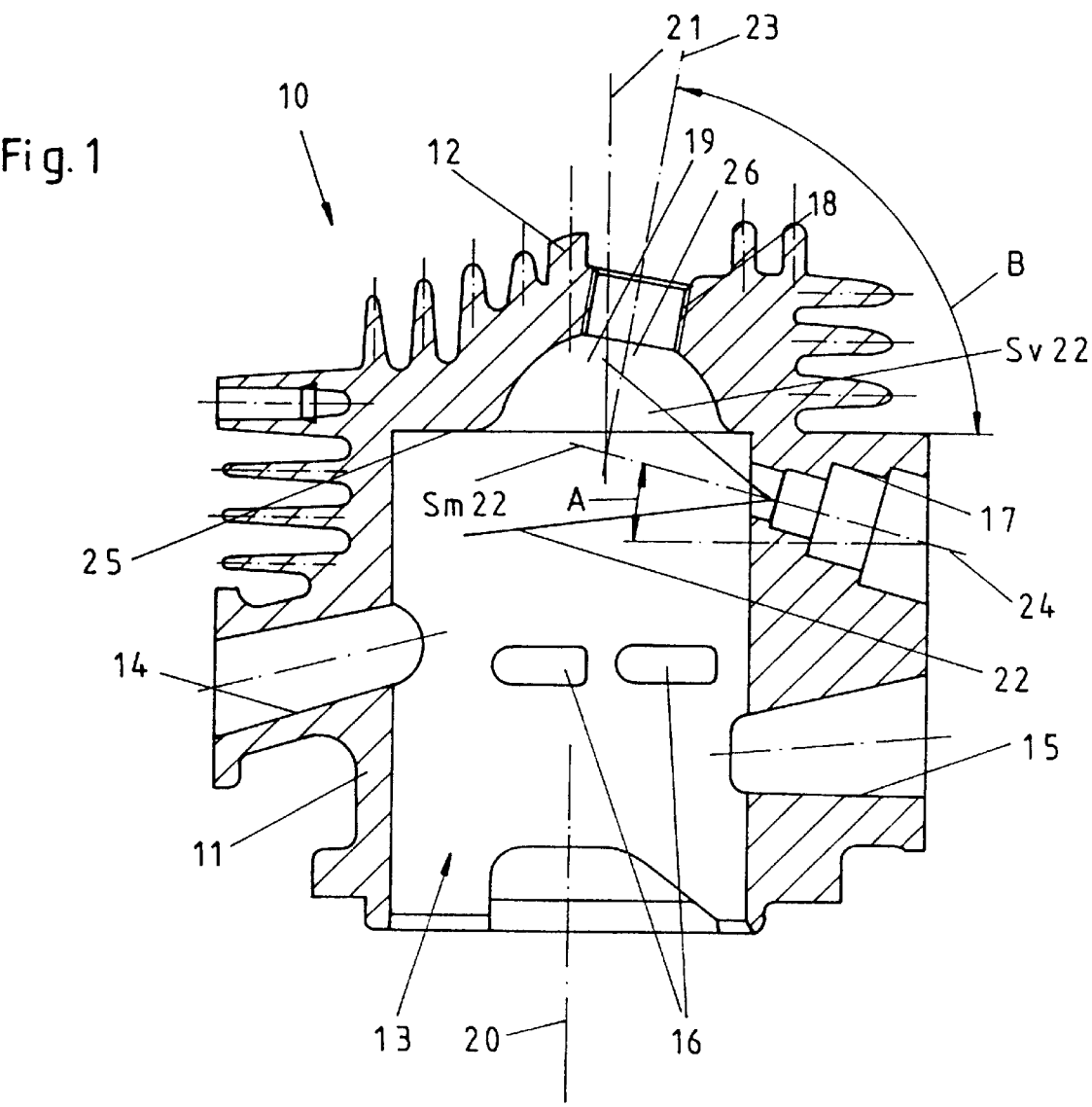
Figure 2:
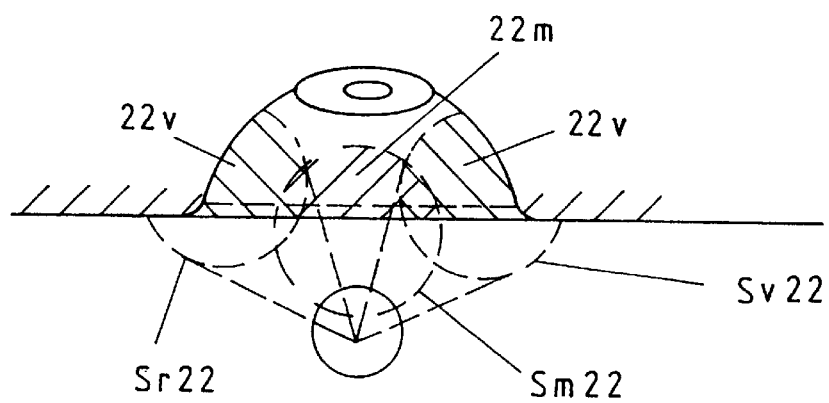

FIG. 1 shows a section through the cylinder and the cylinder head of an engine constructed according to the invention in the plane of the cylinder axis concentrically through the intake and the exhaust duct;

FIG. 2 shows a section as per FIG. 1 with projections of the three injection jets of a triple jet nozzle.

DETAILED DESCRIPTION OF THE PREFERRED EMBODIMENT

The FIG. 1 shows in a longitudinal section in a preferred embodiment example of the invention, a cylinder arrangement 10. The cylinder 11 is, in the top part, closed with a cylinder head equipped with cooling ribs and, on its cylinder bottom plane 25, by means of a cylinder head 12, is likewise provided with cooling ribs. From the cylinder space 13 enclosed by the cylinder 11, in which the non-depicted cylinder moves up and down, in a longitudinal plane which is identical with the plane of the illustration, an exhaust duct 14 for the combustion gases proceeding obliquely downward is guided to the outside. In the same plane, but oppositely located, an intake duct 15 for the combustion air is situated. The combustion air drawn in through the intake duct 15 is, in a normal manner, pressed via the piston through transfer ports into the top portion of the cylinder space 13, where it enters via intake slots 16. The transfer ports located on both sides of the longitudinal plane are directed in such a way that the outflowing combustion air flows in the direction of the oppositely located side (wall) of the cylinder 11 and, in the process, is axially deflected.

The cylinder head 12 possesses a semispherical combustion space 19, into which a spark plug (not depicted) projects laterally and obliquely, while the ignition electrodes project into a subarea 26 of the combustion space.

The angle beta between the spark plug axis 23 and the cylinder bottom plane 25 preferably ranges from 40° to 60°. The combustion space 19 is, with its combustion space exist 21, disposed so as to be offset in relation to the exhaust duct 14 in the opposite direction of the cylinder axis 20. On the same side, directed obliquely in the upward direction, in the wall of the cylinder, a (non-depicted) injection nozzle is fitted. The injection nozzle injects fuel into the combustion or cylinder space and this in the form of a jet cone 22 and the injection cone axis 24 coincide.

The injection nozzle terminates below the compression space formed in the position in the upper compression point within a zone of the cylinder 11 which is thermally acted upon only to a slight extent. The disposition of the injection nozzle and the alignment of the jet cone 22 are preferably selected in such a way that the upper portion of the jet cone 22 penetrates a predominant volume proportion of the combustion space 19 and the remaining bottom portion of the jet cone 22 extends below the cylinder bottom plane 25 and outside the combustion space 19.

The upper and lower portion of the jet cone 22 each constitute halves of the jet cone. The jet cone 22 can advantageously be formed of a plurality of individual jets (FIG. 1). The same applies to both portions of the jet cone 22. About the axis 24, the jet cone 22 extends with preferably an angular aperture of 35° and 55° (on the side facing away from the injection nozzle). The imaginary axis 24 of the jet cone 22 includes with the cylinder bottom plane 25 an angle A of from 10° to 20°. It intersects the cylinder bottom plane 25 beyond the cylinder axis 20 (on the side facing away from the injection nozzle). Thereby, with a homogeneous mixture formation, in the combustion space 19, a subarea 26 (already mentioned in the foregoing) is provided, wherein the spark plug is not reached direct by the jet cone 22.

The section according to FIG. 1 shows with the projections of the three injection jets of a triple-jet nozzle the course of the same approximately obliquely to the cylinder axis. On the jet projections, the surface portions of the three injection jets reaching the combustion space are discernible.

The conically expanding jet Sm 22 intersecting the cylinder longitudinal axis becomes effective air-diffused mainly in the cylinder space and impinges with only a small segment 22 m upon the wall of the combustion space within the area of transition to the cylinder plane which faces the injection nozzle. The two jets Sv 22 not intersecting the cylinder axis reach the combustion space in a different state and each impinges upon the side of the combustion space facing the injection nozzle with approximately 40% of their surface 22 v. In addition, areas of the cylinder bottom and the transitional area to the cylinder plane are sprayed upon, however, they do not strike any wall areas located immediately on both sides of the spark plug.

In FIG. 4, the projections of the three injection jets correspond to their expansion in the plane, in which, in the combustion space, on the side facing away from the injection nozzle, said plane merges with the combustion space.

Altogether, with the invention, a disposition of combustion space and injection guidance results which guarantees an optimal mixture formation, in particular in small cylinder units as well as a reliable function of the spark plug.

| LIST OF REFERENCE NUMBERS | |
|---|---|
| Cylinder arrangement | 10 |
| cylinder | 11 |
| cylinder head | 12 |
| cylinder space | 13 |
| exhaust duct | 14 |
| exhaust duct | 15 |
| exhaust slot | 16 |
| bore (injection nozzle) | 17 |
| bore (spark plug) | 18 |
| combustion space (semispherical) | 19 |
| cylinder axis | 20 |
| combustion space axis | 21 |
| jet cone | 22 |
| spark plug axis | 23 |
| injection cone axis (= imaginary axis of jet cone 22) | 24 |
| cylinder bottom plane | 25 |
| subarea (combustion space) | 26 |
| angle between imaginary jet cone axis 24 and plane parallel to cylinder bottom plane 25 | A |
| angle between spark plug axis 23 and cylinder bottom plane 25 | b eta |

What is claimed is:

1. Mixture-compressing two-stroke Otto engine with fuel injection into the cylinder space (30) of the following construction:

Into a combustion chamber (19) in the cylinder head (12), offset ecccentrically to the cylinder axis (20), which essentially possesses the configuration of a hemisphere, a sparking plug (at 18) projects;

on both sides of the longitudinal plane of the exhaust duct (14) terminate the overflow ducts directed to the cylinder side opposite the exhaust duct;

an injection nozzle terminates in the cylinder side with the induction duct in a thermally less stressed zone outside the combustion space;

the injection takes place directed towards the compression space, characterized by the following features:

the combustion space (19) possesses essentially the configuration of a hemisphere and is, with its combustion space axis (21), disposed so as to be offset relative to the side of the cylinder (11) located opposite the exhaust duct, the injection nozzle being disposed in relation to the combustion space (19) in such a manner that the upper portion of the jet cone (22) penetrates a predominant volume proportion of the combustion space (19), while the lower portion of the jet cone (22) extends underneath the cylinder bottom plane (25) approximately obliquely to the cylinder axis (20), but outside the combustion space (19).

2. Mixture-compressing two-stroke Otto engine according to claim 1, characterized in that the upper and the lower portion of the jet cone (22) each are halves of the jet cone (22).

3. Mixture-compressing two-stroke Otto engine according to claim 1, characterized in that the combustion space (19) possesses a subarea (26) which is not acted upon by the upper portion of the jet cone (22), while within this subarea (26), the spark plug terminates in the combustion space (19).

4. Mixture-compressing two-stroke Otto engine according to claim 1, characterized in that the two portions of the jet cone (22) are formed of a plurality of individual jets.

5. Mixture-compressing two-stroke Otto engine according to claim 4, characterized in that the two portions of the jet cone (22) are each formed of individual jets, which, in relation to an imaginary axis (24) of the jet cone (22), possess different jet axis angles and jet angles.

6. Mixture-compressing two-stroke Otto engine according to any claim 1, characterized in that the jet cone (22) possesses an aperture angle of between 35° and 55° and in that the imaginary axis (24) of the jet cone (22) with the cylinder bottom plane (25) includes an angle (alpha) of 10° to 20° and intersects the cylinder bottom plane (25) on the side of the cylinder axis (20) which faces away from the injection nozzle.

7. Mixture-compressing two-stroke Otto engine according to claim 1, characterized in that the jet cone is formed of three individual jets, in which case two individual jets form the upper regions of a kidney-shaped jet cone and one jet constitutes the concentric region.

8. Mixture-compressing two-stroke Otto engine according to claim 1, chracterized in that two individual jets of the upper region of the kidney-shaped jet cone possess a jet angle of between 20° and 45° and are eccentrically directed to the cylinder axis, in that the jet forming the concentric region of the jet cone preferably possesses a jet angle intersecting the cylinder axis, which, however, impinges predominantly upon the cylinder bottom plane and merely the marginal area of the side of the combustion space facing the nozzle.

* * * * *